(12) United States Patent
Kitagawa et al.

(10) Patent No.: US 10,678,353 B2
(45) Date of Patent: Jun. 9, 2020

(54) ELECTRONIC APPARATUS FOR COMMUNICATION BETWEEN ELECTRONIC PEN AND EXTERNAL DEVICE

(71) Applicant: FUJI XEROX CO., LTD., Tokyo (JP)

(72) Inventors: Nobuhiro Kitagawa, Kanagawa (JP); Eisuke Osakabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 255 days.

(21) Appl. No.: 15/139,764

(22) Filed: Apr. 27, 2016

(65) Prior Publication Data

US 2017/0185167 A1 Jun. 29, 2017

(30) Foreign Application Priority Data

Dec. 28, 2015 (JP) ................................ 2015-256404

(51) Int. Cl.
*G06F 3/038* (2013.01)
*G06F 1/16* (2006.01)
*G06F 3/0354* (2013.01)

(52) U.S. Cl.
CPC ............ *G06F 3/038* (2013.01); *G06F 1/1607* (2013.01); *G06F 1/1632* (2013.01); *G06F 3/03545* (2013.01)

(58) Field of Classification Search
CPC ....................................................... G06F 3/038
See application file for complete search history.

(56) References Cited

U.S. PATENT DOCUMENTS

| | | | |
|---|---|---|---|
| 2005/0057534 A1* | 3/2005 | Charlier ................ | G06F 3/0312 345/179 |
| 2007/0268278 A1* | 11/2007 | Paratore .............. | G06F 3/03545 345/179 |
| 2008/0219201 A1 | 9/2008 | Challapali et al. | |
| 2008/0225878 A1 | 9/2008 | Cordeiro et al. | |
| 2008/0253341 A1 | 10/2008 | Cordeiro et al. | |
| 2008/0253347 A1 | 10/2008 | Cordeiro et al. | |
| 2008/0259811 A1 | 10/2008 | Cordeiro et al. | |
| 2008/0259859 A1 | 10/2008 | Cordeiro et al. | |
| 2009/0040986 A1 | 2/2009 | Cordeiro et al. | |

(Continued)

FOREIGN PATENT DOCUMENTS

| | | |
|---|---|---|
| CN | 1834880 A | 9/2006 |
| CN | 101821113 A | 9/2010 |

(Continued)

OTHER PUBLICATIONS

Apr. 9, 2019 Office Action issued in Japanese Patent Application No. 2015-256404.

(Continued)

*Primary Examiner* — William Boddie
*Assistant Examiner* — Andrew B Schnirel
(74) *Attorney, Agent, or Firm* — Oliff PLC

(57) ABSTRACT

Provided is an electronic apparatus including a supporting member that supports an electronic pen including a terminal when the electronic pen is inserted into the apparatus, an electrode that is movably supported, and a movement mechanism that moves the electrode to a first position where the electrode comes into contact with the terminal by a force received from the electronic pen, when the electronic pen is inserted into the apparatus.

15 Claims, 14 Drawing Sheets

(56) References Cited

U.S. PATENT DOCUMENTS

| | | | | |
|---|---|---|---|---|
| 2009/0273588 A1* | 11/2009 | King | ...................... | G02B 26/06 |
| | | | | 345/179 |
| 2010/0084202 A1* | 4/2010 | Selin | ................... | G06F 3/03545 |
| | | | | 178/19.01 |
| 2014/0300586 A1* | 10/2014 | Dowd | ................. | G06F 3/03545 |
| | | | | 345/179 |

FOREIGN PATENT DOCUMENTS

| | | |
|---|---|---|
| JP | H06-124735 A | 5/1994 |
| JP | 2006-260345 A | 9/2006 |
| JP | 2009-509380 A | 3/2009 |
| JP | 2016-126412 A | 7/2016 |

OTHER PUBLICATIONS

Jun. 3, 2019 Office Action issued in Chinese Patent Application No. 201610397703.1.

Jan. 6, 2020 Office Action issued in Chinese Patent Application No. 201610397703.1.

\* cited by examiner

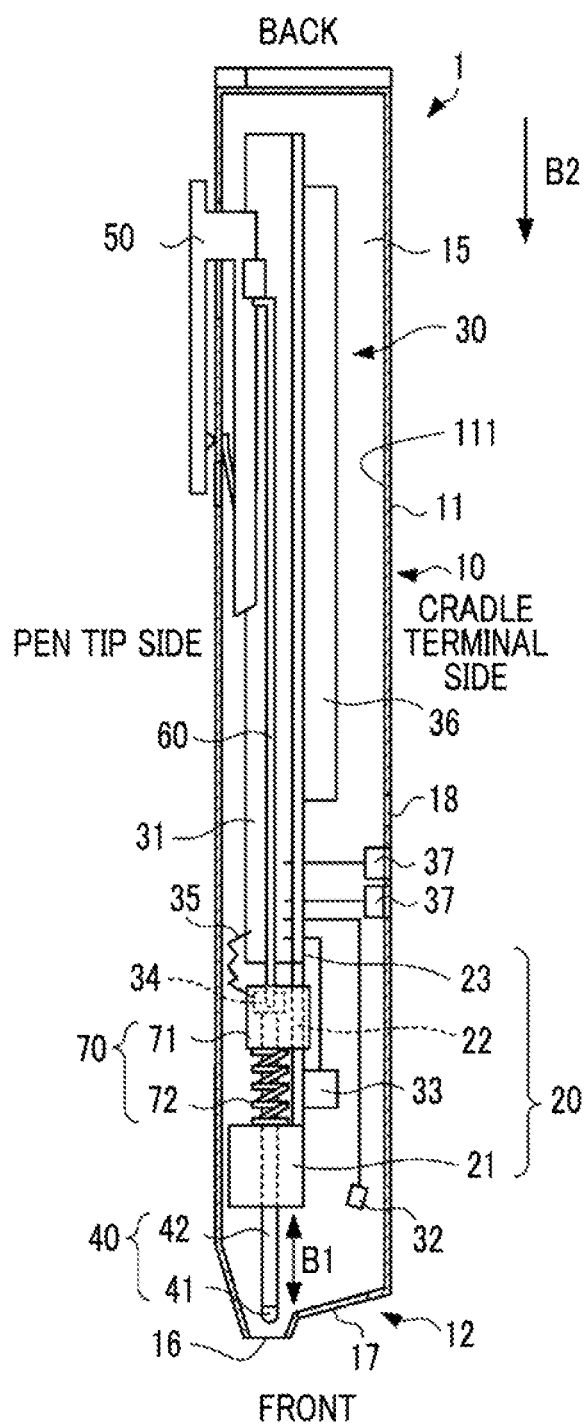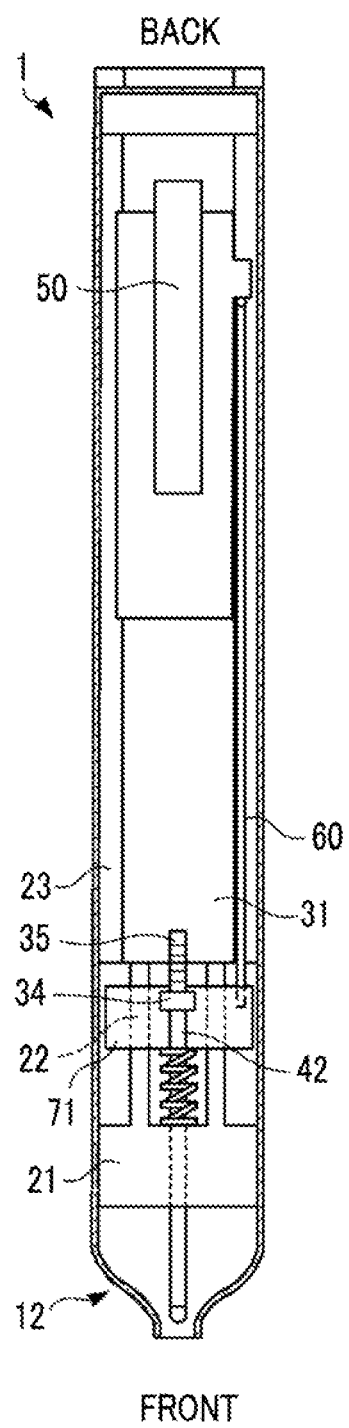

FIG. 11A
FIG. 11B
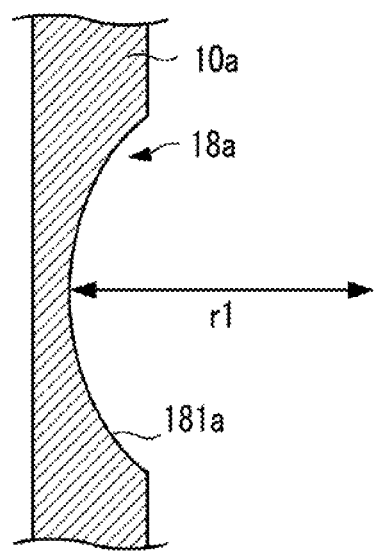
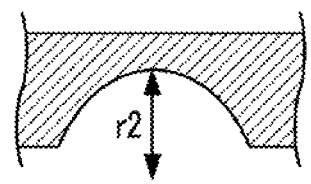

ELECTRONIC APPARATUS FOR COMMUNICATION BETWEEN ELECTRONIC PEN AND EXTERNAL DEVICE

CROSS-REFERENCE TO RELATED APPLICATIONS

This application is based on and claims priority under 35 USC 119 from Japanese Patent Application No. 2015-0256404 filed Dec. 28, 2015.

BACKGROUND (i) Technical Field

The present invention relates to an electronic apparatus.

(ii) Related Art

There have been known electronic apparatuses that are electrically connected to an electronic pen inserted thereinto.

SUMMARY

According to an aspect of the invention, there is provided an electronic apparatus including:

a supporting member that supports an electronic pen including a terminal when the electronic pen is inserted into the apparatus;

an electrode that is movably supported; and a movement mechanism that moves the electrode to a first position where the electrode comes into contact with the terminal by a force received from the electronic pen, when the electronic pen is inserted into the apparatus.

BRIEF DESCRIPTION OF THE DRAWINGS

Exemplary embodiments of the present invention will be described in detail based on the following figures, wherein:

FIGS. 3A and 3B are diagrams illustrating a configuration of an electronic pen;

FIGS. 11A and 11B are diagrams illustrating a recess according to a modification example;

DETAILED DESCRIPTION

[1] Example

Figure 1:
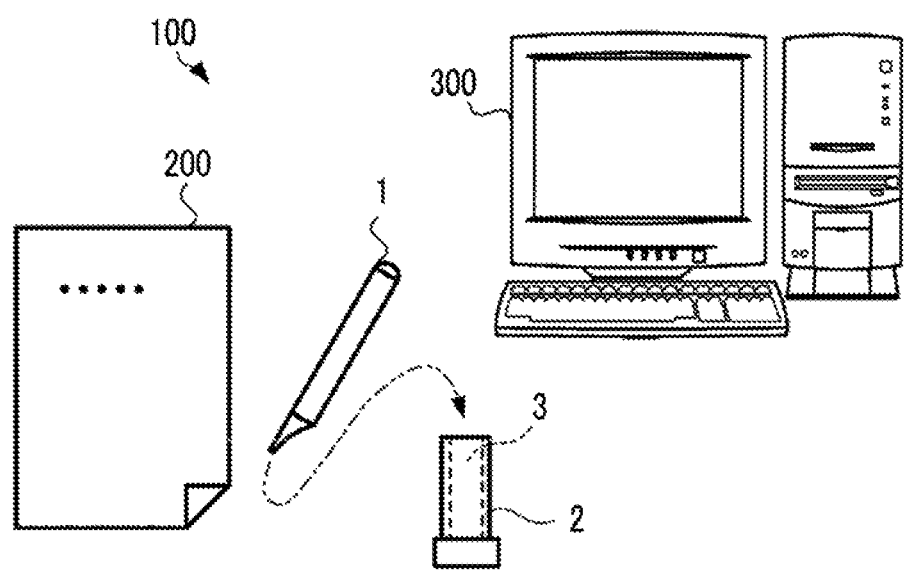
FIG. 1 is a diagram illustrating the overall configuration of an electronic pen system according to an example.

FIG. 1 illustrates the overall configuration of an electronic pen system 100 according to an example. The electronic pen system 100 includes an electronic pen 1, a cradle 2, a medium 200, and a personal computer (PC) 300. The electronic pen 1 realizes a function of allowing a user to write a character or a figure on the medium 200 by his or her hand and a function of capturing an encoded image formed on the medium 200. The encoded image formed on the medium 200 is obtained by encoding and imaging information in accordance with a determined encoding scheme.

The cradle 2 is an electronic apparatus that electrically connected to the electronic pen 1 to mediate communication between the electronic pen 1 and an external device and supply power to the electronic pen 1 (in other words, has a communication function and a charging function). The cradle 2 has a hole 3 into which the electronic pen 1 is inserted, and is electrically connected to the electronic pen 1 by inserting the electronic pen 1 into the hole 3.

The medium 200 may be formed of paper or plastic such as an OHP sheet, and any of other materials, or may be electronic paper having display contents electrically rewritten thereon. When information is decoded from an encoded image at a position designated by the electronic pen 1, the PC 300 executes processing using the decoded information. For example, the PC 300 electronizes contents written by a user's hand using the electronic pen 1 to thereby generate electronic data indicating an electronic document.

Figure 2:
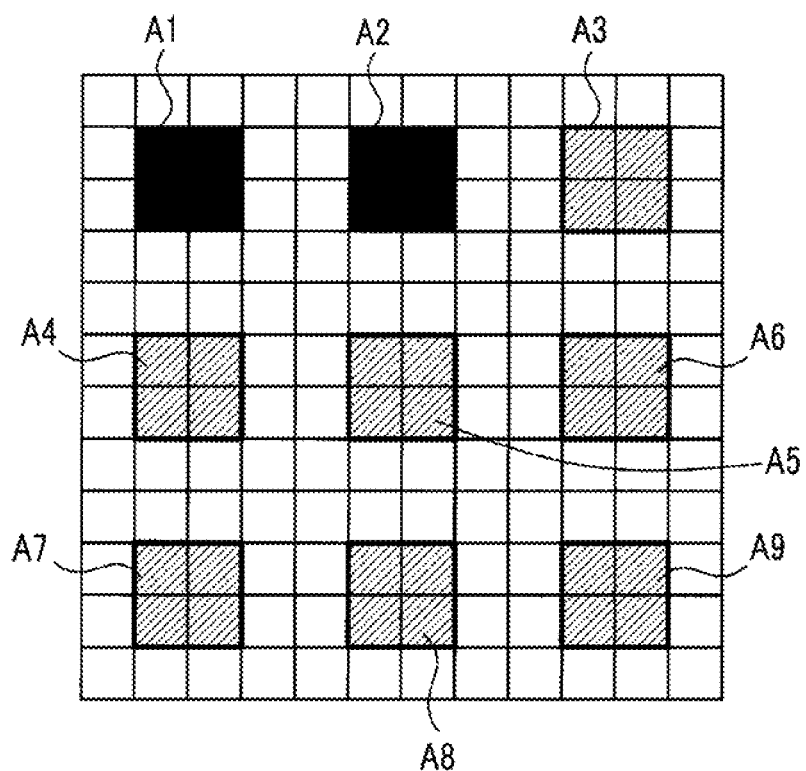
FIG. 2 is a diagram illustrating an encoded image.

FIG. 2 is a diagram illustrating an encoded image. As illustrated in FIG. 2, the encoded image is constituted by a set of plural point-like images. In FIG. 2, rectangular regions A1 and A2 colored in black correspond to regions in which a point-like image is disposed, and regions A3 to A9 filled by oblique lines correspond to regions in which a point-like image is not disposed. The encoded image is an image indicating identification information for identifying the medium 200 or position information indicating a position on the medium 200, and has information indicated in accordance with an arrangement pattern of a point-like image.

FIGS. 3A and 3B illustrate a configuration of the electronic pen 1. The electronic pen 1 in the drawing includes a housing 10, a frame 20, an electronic component group 30, a refill 40, a knocking member 50, a shaft 60, and a supporting member 70. FIG. 3A illustrates the electronic pen 1 viewed from the width direction, and FIG. 3B illustrates the electronic pen 1 when the knocking member 50 is viewed from the front side. In the electronic pen 1, a side to which a pen tip 41 to be described later is attached is assumed to be a front side, and a side opposite thereto is assumed to be a back side.

The housing 10 is a long member having a pipe-shaped portion, and is formed of a nonmetallic material (for example, a resin material). The housing 10 includes a cylindrical portion 11 having a cylindrical shape, and a tip portion 12 which is formed at the front side of the cylindrical portion 11, has a tapered shape, and has the pen tip 41, to be described later, protruding therefrom. An internal space 15 having a columnar shape is formed on an inner circumferential surface 111 side of the cylindrical portion 11. Portions included in the electronic pen 1 are stored in the internal space 15, that is, inside the housing 10.

An opening 16 serving as a path during the protrusion of the pen tip 41, to be described later, from the housing 10 and an opening 17 serving as a path of light during the imaging of the above-mentioned encoded image are formed in the tip portion 12. In addition, a recess 18 is formed in the cylindrical portion 11 of the housing 10. The recess 18 is a portion that comes into contact with a member (to be described later in detail) which pushes the electronic pen 1 inserted in to the cradle 2 so as to prevent the rotation of the electronic pen.

The frame 20 is a framework which is fixed to the housing 10 and supports the electronic component group 30. The frame 20 includes a fixed portion 21, a guiding portion 22, and a supporting portion 23. The fixed portion 21 has a surface having a size and a shape which are common to the inner circumferential surface 111 of the cylindrical portion 11, and is fixed to the inner circumferential surface 111 through adhesion or the like. The guiding portion 22 has a shape of two bars, and movably supports a slider 71, included in the supporting member 70 to be described later, along the bars. The supporting portion 23 supports a substrate 31 and a battery 36 that are included in the electronic component group 30 to be described later.

The electronic component group 30 is plural electronic components for allowing the electronic pen 1 to realize a function of capturing the above-mentioned encoded image. The electronic component group 30 includes the substrate 31, an irradiation device 32, a photographing device 33, a pressure sensor 34, a flexible printed circuit 35, the battery 36, and plural cradle terminals 37.

The substrate 31 includes a computation device including a central processing unit (CPU) or an application specific integrated circuit (ASIC), a memory, and the like, and performs a process of managing a power supply of the electronic pen 1, a process of controlling the driving of the irradiation device 32 and the photographing device 33, a process of photographing an encoded image, a process of transmitting the photographed encoded image to the PC 300, and the like.

The irradiation device 32 includes a light source such as a light emitting diode (LED), and performs irradiation with light emitted from the light source (infrared light in this example) in a direction of the opening 17. The photographing device 33 includes a lens, a narrowing portion, a reflector, an image sensor, and the like, and receives light incident from the opening 17 to photograph a subject (for example, the above-mentioned coded image).

The pressure sensor 34 measures a force for pushing the pen tip 41 to be described later. The force for pushing the pen tip 41 refers to pressure acting on the pen tip 41 pushed against a medium during the writing using the electronic pen 1, that is, refers to writing pressure. The flexible printed circuit 35 is a substrate that maintains its electrical characteristics even when the flexible printed circuit is repeatedly deformed, and electrically connects the substrate 31 and the pressure sensor 34 to each other. The battery 36 is, for example, a rechargeable battery, and supplies power for driving the electronic pen 1 to each portion of the electronic pen 1.

All of the plural cradle terminals 37 are terminals provided in the cylindrical portion 11 of the housing 10, and are individually electrically connected to the substrate 31. The cradle terminal 37 is an example of a "terminal" of the present invention. The cradle terminal 37 comes into contact with an electrode of the cradle 2 in a state where the electronic pen 1 is inserted into the cradle 2, and electrically connects the substrate 31 and the cradle 2 to each other. Thereby, an external device and the substrate 31 connected to each other through the cradle 2 communicate with each other, or power supplied from the external device is supplied to the substrate 31. When power is supplied to the substrate 31 through the cradle terminal 37, the substrate operates the substrate itself and each portion by the supplied power and charges the battery 36.

The refill 40 is a so-called spare lead, and is configured to be removed from the electronic pen 1 and to be capable of being replaced with another refill 40. The refill 40 is a straight bar-shaped member, and is movably supported by the supporting member 70 to be described later in a longitudinal direction B1 indicated by an arrow in the drawing. The longitudinal direction B1 refers to a direction along the length of the bar-shaped refill 40. The refill 40 includes the pen tip 41 at the front side thereof, and includes an ink storage portion 42 at the back side of the pen tip 41.

The pen tip 41 is disposed at a position in which the refill 40 protrudes from the opening 16 when moving to the longitudinal direction B1. Since the opening 17 serving as a path of light is larger than the opening 16, the pen tip 41 is disposed at a position separated from the axis of the cylindrical portion 11, in other words, a position closer to the cylindrical portion 11 side than the axis. In the electronic pen 1, a side coming near the pen tip 41 (left side in FIG. 3A) is assumed to be a pen tip side. The cradle terminal 37 is provided on a side opposite to the pen tip side. In the electronic pen 1, a side in which the cradle terminal 37 is provided (right side in FIG. 3A) is assumed to be a cradle terminal side.

The ink storage portion 42 has a shape of a rotating body of which the axis is along the longitudinal direction B1 (specifically, a cylinder), and stores ink to be supplied to the pen tip 41 in a hollow inside thereof. In FIGS. 3A and 3B, the pen tip 41 is drawn back into the housing 10. However, when the pen tip 41 is moved in a forward direction B2 directed to the front side of the electronic pen 1 from the back side thereof (may be moved in a direction directed to the front side along the longitudinal direction B1) and protrudes from the housing 10, a writing operation is performed by pushing the pen tip 41 against a medium, and thus ink is ejected from the pen tip 41 to thereby draw a character or a pattern.

The knocking member 50 is a member to which a force for allowing the pen tip 41 to protrude to the outside of the housing 10 is applied. The knocking member 50 comes into contact with an object (for example, a user's finger) behind the refill 40 and has a force from the object applied thereto. The knocking member 50 transmits a force applied from the outside to the shaft 60.

The shaft 60 is an elongate bar-shaped member formed of stainless steel in this example. The shaft 60 transmits a force (force received from the outside by the knocking member 50) which is received from the outside behind the refill 40 to move the refill 40 in the longitudinal direction B1. When a forward force is applied to the knocking member 50, the shaft 60 is moved forwardly by the force transmitted from the knocking member 50. A front end of the shaft 60 is fixed to the supporting member 70.

The supporting member 70 is a member that movably supports the refill 40 in the longitudinal direction B1 by having the refill 40 fixed thereto and moving with the frame 20 as a guide. The supporting member 70 includes the slider 71 and a spring 72. The slider 71 is guided by the guiding portion 22 included in the frame 20 and is moved along the longitudinal direction B1. The slider 71 has the rear end of the refill 40 fixed thereto and has the front end of the shaft 60 fixed thereto. For this reason, when the shaft 60 is moved forwardly, the slider 71 is also moved forwardly, and the refill 40 is also moved forwardly accordingly.

The slider 71 is provided with the pressure sensor 34 mentioned above. The pressure sensor 34 is provided at a position where the pressure sensor 34 comes into contact with the rear end of the refill 40. For this reason, when the pen tip 41 of the refill 40 is pushed against a medium, a reaction force from the medium with respect to pressure (writing pressure) of the pen tip 41 which is applied to the medium is transmitted to the pressure sensor 34 through the refill 40 and is measured as pressure.

The spring 72 is configured such that the front end thereof comes into contact with the fixed portion 21 of the frame 20 and is configured not to be moved forwardly any more. In addition, the spring 72 has a rear end that comes into contact with the slider 71 and applies a rearward force to the slider 71. Thereby, even when the front side of the electronic pen 1 is directed vertically downward, the refill 40 is not rushed out. However, when a force is applied to the knocking member 50, the shaft 60 and the supporting member 70 are moved forwardly, and thus the pen tip 41 of the refill 40 protrudes from the housing 10.

Figure 4A:
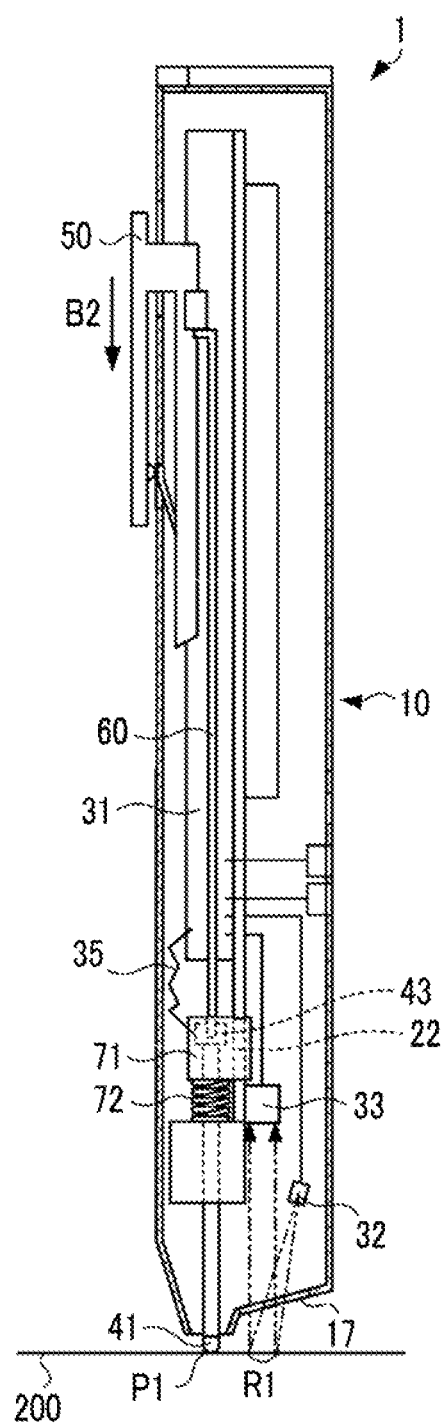
FIGS. 4A and 4B are diagrams illustrating the electronic pen having a pen tip protruding therefrom.
Figure 4B:
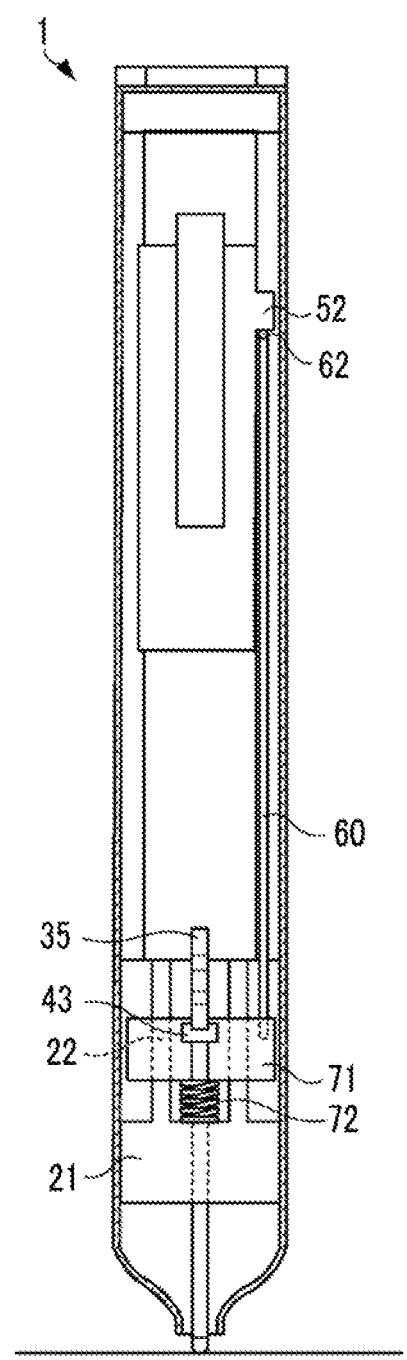

FIGS. 4A and 4B illustrate the electronic pen 1 having the pen tip 41 protruding therefrom. As illustrated in FIGS. 4A and 4B, when the knocking member 50 is moved forwardly, a switch for starting up the substrate 31 is pushed down by the knocking member 50, and power is supplied to each portion in the electronic component group 30. Power is supplied to the pressure sensor 34 through the flexible printed circuit 35. In addition, a signal from the pressure sensor 34 is transmitted to the substrate 31 through the flexible printed circuit 35.

FIGS. 4A and 4B illustrate a state where the pen tip 41 is pushed against the medium 200. In this state, the pressure sensor 34 measures writing pressure, a value of the measured writing pressure is supplied to the substrate 31 through the flexible printed circuit 35. For example, when writing pressure having a value equal to or greater than a threshold value is measured, the substrate 31 performs control so as to drive the irradiation device 32 and the photographing device 33. Thereby, infrared light emitted from the irradiation device 32 reaches a region R of the medium 200 through the opening 17, and infrared light (diffused and reflected light) which is diffused and reflected in the region R reaches the photographing device 33. The diffused and reflected light indicates an encoded image formed in the region R.

The region R is a region located at a position corresponding to a contact position P1 in which the pen tip 41 comes into contact with the medium 200. Specifically, the region R is present at a position shifted in a direction directed to the photographing device 33 from the refill 40 by a distance between the refill 40 and the photographing device 33, rather than being present at the contact position P1. The photographing device 33 is a sensor that reads light from the region R, and photographs an encoded image indicated by the read light (diffused and reflected light).

The photographing device 33 performs the photographing at a frame rate (for example, 60 frames per second (fps)) which is determined in advance. The substrate 31 decodes information indicated by the encoded image from the photographed encoded image to thereby extract identification information and position information. For this extraction, a well-known technique may be used, and, for example, a technique disclosed in JP-A-2013-152705 is used. The substrate 31 transmits the extracted pieces of information to the PC 300.

Figure 5:
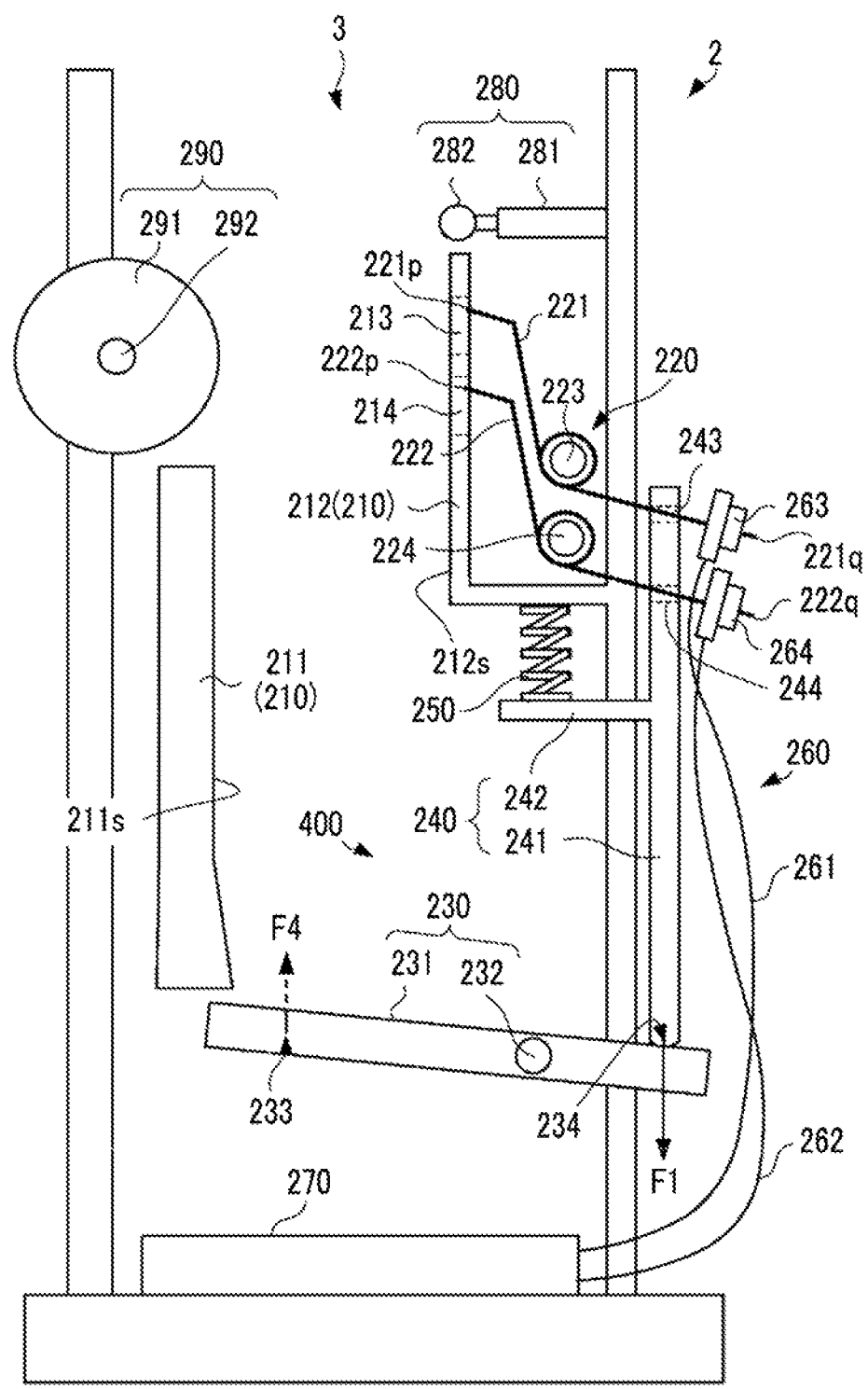
FIG. 5 is a diagram illustrating a configuration of a cradle.

FIG. 5 illustrates a configuration of the cradle 2. FIG. 5 illustrates the cradle 2 installed on a desk or the like when viewed in a horizontal direction. The cradle 2 has a shape covering the electronic pen 1 inserted thereinto, but FIG. 5 illustrates an end face of a member having a shape covering the electronic pen 1 for the sake of understanding the inside of the cradle 2. The cradle 2 includes a supporting member 210, an electrode portion 220, a movement mechanism 400, a wiring member 260, a substrate 270, a pen locking mechanism 280, and a roller 290.

The supporting member 210 is a member that supports the electronic pen 1 inserted into the cradle 2. The supporting member 210 forms the outer circumference of the hole 3 into which the electronic pen 1 is inserted. The supporting member 210 includes a first supporting member 211 and a second supporting member 212. The first supporting member 211 includes a contact surface 211s that comes into contact with the inserted electronic pen 1, and supports the pen tip side of the electronic pen 1 which is described in FIGS. 3A and 3B. The second supporting member 212 includes a contact surface 212s that comes into contact with the inserted electronic pen 1, and supports the cradle terminal side of the electronic pen 1. Electrode holes 213 and 214 for transmitting an electrode included in the electrode portion 220 to be described later are formed in the second supporting member.

The electrode portion 220 includes electrodes 221 and 222 and rotation axes 223 and 224. The electrodes 221 and 222 are movably supported. In detail, the electrode 221 is rotatably supported centering on the rotation axis 223, and is disposed such that a tip 221p thereof protrudes from the contact surface 212s of the second supporting member 212 through the electrode hole 213 by the rotation of the electrode. FIG. 5 illustrates a state where the tip 221p is drawn back further than the contact surface 212s. The electrode 222 is rotatably supported centering on the rotation axis 224, and is disposed such that a tip 222p thereof protrudes from the contact surface 212s of the second supporting member 212 through the electrode hole 214 by the rotation of the electrode. FIG. 5 illustrates a state where the tip 222p is retracted further than the contact surface 212s.

When the electronic pen 1 is inserted into the cradle 2, the movement mechanism 400 moves the electrodes 221 and 222 to a position (hereinafter, referred to as a "first position") which comes into contact with the cradle terminal 37 by a force received from the electronic pen 1. The movement mechanism 400 includes a tip holding member 230, an electrode holding member 240, and a coil spring 250.

The tip holding member 230 is a member against which the tip portion 12 of the inserted electronic pen 1 is pushed, and holds the pushed tip portion 12. The tip holding member 230 includes a plate member 231 and a fulcrum member 232. The plate member 231 is a plate-shaped member, and is rotatably supported centering on the fulcrum member 232 which is a columnar member. The tip portion 12 of the electronic pen 1 is configured such that a contact region 233 of the plate member 231 on the first supporting member 211 side comes into contact with the plate member 231. The plate member 231 is configured such that a contact region 234 on a side opposite to the contact region 233 with the fulcrum member 232 interposed therebetween comes into contact with the electrode holding member 240.

The electrode holding member 240 is a member that holds the electrode 221 and the electrode 222. The electrode holding member 240 includes a first plate member 241 and a second plate member 242. The first plate member 241 brings a vertically downward end into contact with the contact region 234 of the plate member 231 and is supported by the tip holding member 230. When the plate member 231 of the tip holding member 230 rotates around the fulcrum member 232, the first plate member 241 is moved up and down accordingly.

The first plate member 241 has electrode holes 243 and 244 formed on a vertically upward side thereof. A rear end 221q side opposite to the tip 221p of the electrode 221 passes through the electrode hole 243, and a rear end 222q side opposite to the tip 222p of the electrode 222 passes through the electrode hole 244. In the state illustrated in FIG. 5, rear end sides of both the electrodes receive a vertically downward force by the first plate member 241 and rotate around the respective rotation axes by the force, so that the tips of both the electrodes are drawn back further than the contact surface 212s of the second supporting member 212.

The second plate member 242 is configured such that one end thereof is fixed to the first plate member 241 and one end of the coil spring 250 is in contact with a surface facing vertically upward. The other end of the coil spring 250 is in contact with the second supporting member 212, and it is assumed that this position is not moved. In other words, the second plate member 242 receives a vertically downward force from the coil spring 250. A force F1 which is the sum of the force received from the coil spring 250 and gravity applied to the first plate member 241 and the second plate member 242 is applied to the contact region 234 of the plate member 231 in a vertically downward direction. Rear end sides of the electrode 221 and the electrode 222 are pushed vertically downward by the force F1, and the contact region 233 side of the plate member 231 is pushed vertically upward.

The wiring member 260 is a member having a wiring that electrically connects the electrode portion 220 and the substrate 270 to each other. The wiring member 260 includes a first flexible printed circuit (FPC) 261 and a second FPC 262. The first FPC 261 is configured such that one end thereof is soldered to the electrode 221 by solder 263 on a side closer to the rear end 221q side than the electrode hole 243 and the other end thereof is connected to the substrate 270. The second FPC 262 is configured such that one end thereof is soldered to the electrode 222 by solder 264 on a side closer to the rear end 222q side than the electrode hole 244 and the other end thereof is connected to the substrate 270. Thereby, the electrodes and the substrate 270 are electrically connected to each other.

The substrate 270 is connected to an external power supply and external device not shown in the drawing, and charges the battery 36 of the electronic pen 1 and mediates communication between the electronic pen 1 and the external device when the electronic pen 1 is connected thereto through the electrode 221 and the electrode 222. The substrate 270 is an example of an "electronic component" of the present invention. Meanwhile, another electronic component may be provided instead of the substrate 270 (for example, a terminal for connecting a cable to the substrate in a case where the substrate is externally provided).

The pen locking mechanism 280 is a mechanism that locks the electronic pen 1 inserted into the cradle 2 so as to prevent the electronic pen from rotating around the axis of the cylindrical portion 11. The roller 290 is a member that pushes the cradle terminal side of the electronic pen 1 inserted into the cradle 2 against the second supporting member 212. The pen locking mechanism 280 and the roller 290 will be described later in detail.

Figure 6:
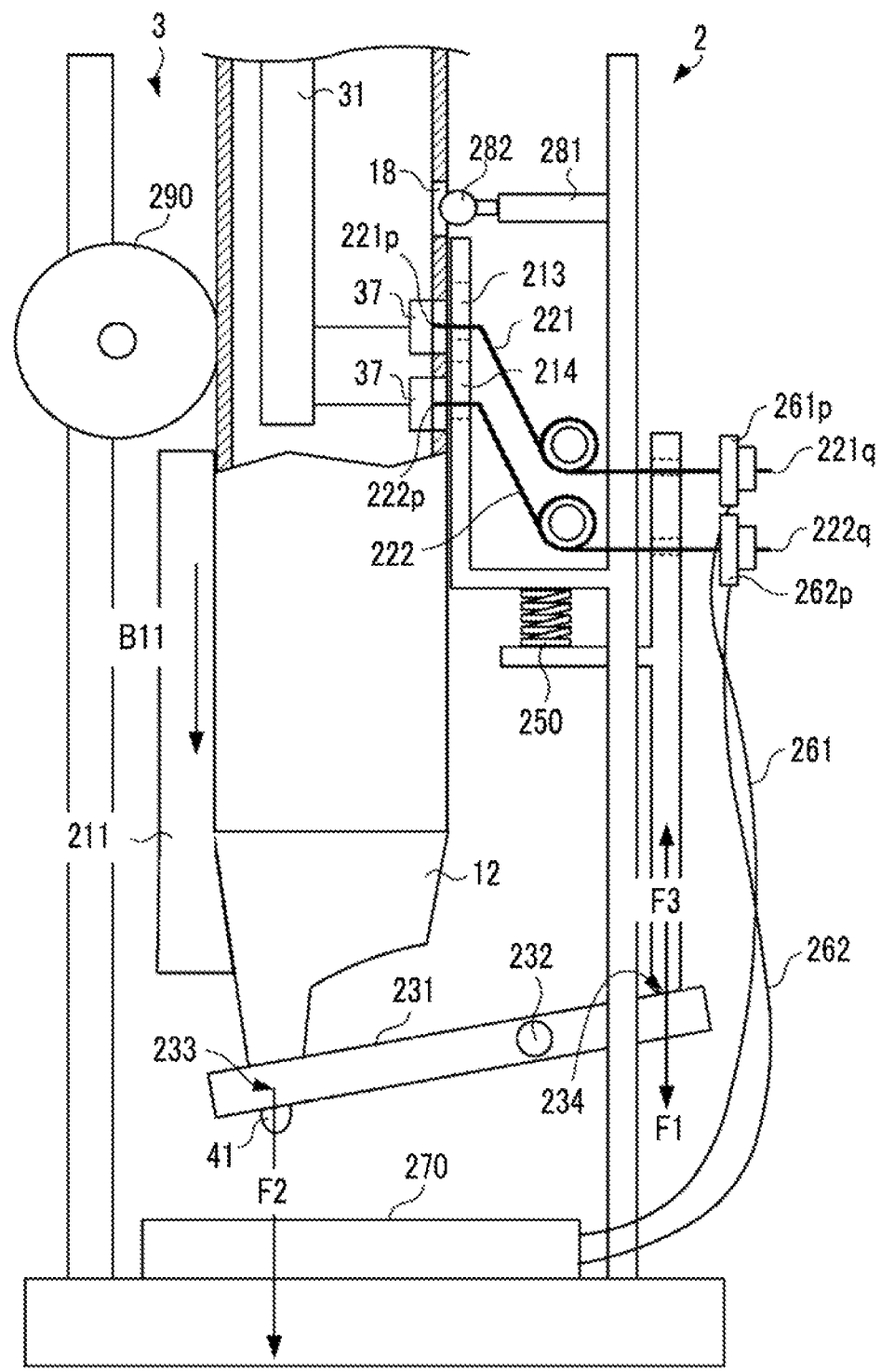
FIG. 6 is a diagram illustrating a state where the electronic pen is inserted into the cradle.

FIG. 6 illustrates a state where the electronic pen 1 is inserted into the cradle 2. The electronic pen 1 inserted into the cradle 2 by a user is moved in an insertion direction B11 and is supported by the pen tip side thereof that comes into contact with the first supporting member 211, the cradle terminal side thereof that comes into contact with the second supporting member 212, and the tip portion 12 that comes into contact with the tip holding member 230. In the tip holding member 230, a hole is provided at a location in which the pen tip 41 of the electronic pen 1 inserted into the cradle is positioned. The shape of the hole will be described in detail with reference to FIGS. 7A to 7C.

Figure 7A:
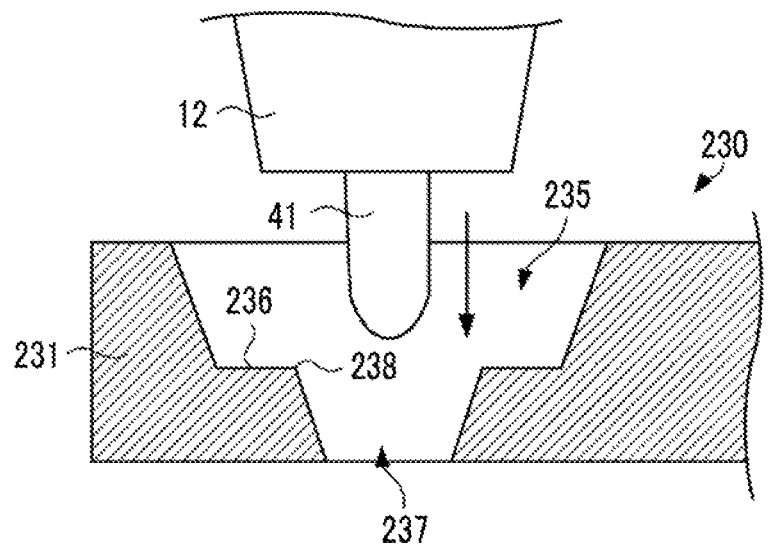
FIGS. 7A, 7B, and 7C are enlarged views of a plate member of a tip holding member.
Figure 7B:
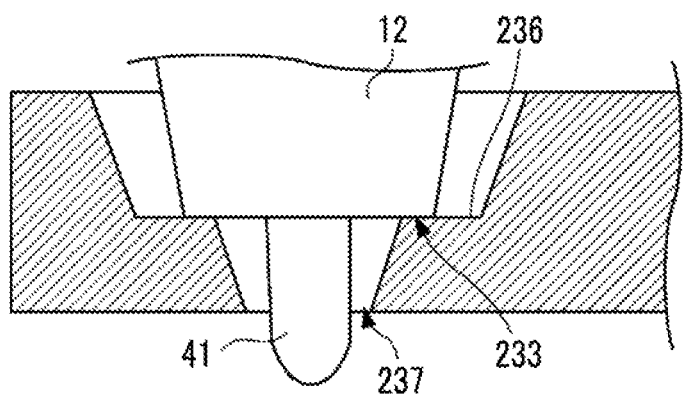
Figure 7C:
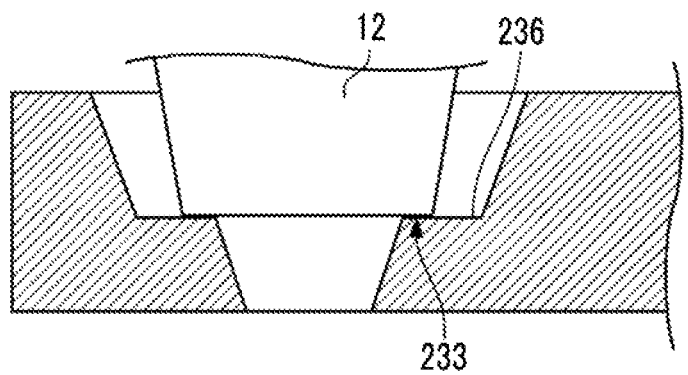

FIGS. 7A to 7C illustrate the plate member 231 of the tip holding member 230 in an enlarged manner. The plate member 231 includes a hole 235. The hole 235 includes a step surface 236 and an opening 237. The hole 235 is a hole which is configured such that a side having the tip portion 12 of the electronic pen 1 inserted thereinto is wide and which becomes narrower toward the opposite side. In addition, the hole 235 is narrowed in the middle thereof, and the step surface 236 is formed in a stepped portion thereof. The step surface 236 is a surface facing the tip portion 12 side, and has a circular ring shape.

An inner edge 238 of the step surface 236 has such a size as to make the pen tip 41 pass therethrough but not to make the tip portion 12 of the housing 10 pass therethrough. In addition, the opening 237 has such a size as to make the pen tip 41 pass therethrough. Thereby, in a case where the tip portion 12 having the pen tip 41 protruding therefrom is inserted as illustrated in FIG. 7A, the pen tip 41 passes through the inner edge 238 and the opening 237 as illustrated in FIG. 7B, while the tip portion 12 is stopped while being in contact with the step surface 236. A region of the step surface 236 which comes into contact with the tip portion 12 is the contact region 233 illustrated in FIG. 5.

In this manner, the providing of the hole 235 prevents the pen tip 41 from coming into contact with the tip holding member 230 even in a state where the pen tip 41 of the electronic pen 1 protrudes. In addition, since the pen tip side of the electronic pen 1 comes to the contact region 233 side, the electronic pen 1 is supported by making the cradle terminal 37 face toward the electrodes 221 and 222.

In addition, even in a case where the electronic pen 1 having the pen tip 41 not protruding is inserted, the tip portion 12 is stopped while being in contact with the step surface 236 as illustrated in FIG. 7C. In this manner, the electronic pen 1 is held by the tip holding member 230 regardless of the state of the pen tip 41 in the electronic pen 1. In addition, a distance between the cradle terminal 37 and the tip holding member 230 during the insertion of the electronic pen 1 into the cradle 2 is common to a state where the pen tip 41 protrudes and a state where the pen tip 41 does not protrude, and thus the cradle terminals 37 come into contact with the electrodes 221 and 222 moved to the first position.

Referring back to FIG. 6, a vertically downward force F2 is applied to the contact region 233 of the plate member 231 of the tip holding member 230 by the weight of the electronic pen 1. A vertically upward force F3 is applied to the contact region 234 on the opposite side through the fulcrum member 232 by the force F2. A distance between the contact region 234 and the fulcrum member 232 is shorter than a distance between the contact region 233 and the fulcrum member 232. For this reason, the force F3 becomes smaller than the force F2, but becomes larger than the force F1 (force which is the sum of a force from the coil spring 250 and gravity applied to the first plate member 241 and the second plate member 242) which is illustrated in FIG. 5.

For this reason, the contact region 234 side of the plate member 231 is pushed vertically upward, and the electrode holding member 240 is pushed up. As a result, the tips 221p and 222p of the respective electrodes 221 and 222 protrude from the contact surface 212s of the second supporting member 212 by the rotation of the electrodes 221 and 222. At this time, the electronic pen 1 is inserted up to a position where the tip portion 12 pushes down the plate member 231, and the cradle terminal 37 reaches a position where the electrode holes 213 and 214 face each other. For this reason, the tip 221p of the electrode 221 protruding from the electrode hole 213 and the tip 222p of the electrode 222 protruding from the electrode hole 214 come into contact with the corresponding cradle terminals 37, respectively.

As described above, the tip holding member 230 is a member having a posture changing by being pushed against the electronic pen 1 inserted into the cradle 2, and is an example of a "posture changing member" of the present invention. The term "posture" as used herein refers to the direction, position, shape, or the like of the member. In this example, the direction of the tip holding member 230 changes. In addition, the tip holding member 230 has a posture changing by the contact region 233, which is a portion that comes into contact with the electronic pen 1, being pushed down due to the weight of the electronic pen 1. The movement mechanism 400 moves the electrodes 221 and 222 up to the above-mentioned first position (position where the electrode comes into contact with the cradle terminal 37) by a force applied by the tip holding member 230 having a changed posture. The force applied by the tip holding member 230 having a changed posture is applied to the electrodes 221 and 222 through the electrode holding member 240.

When the electrode of the cradle is fixed while protruding, the electrode and the cradle terminal are rubbed against each other, and thus both the electrode and the cradle terminal are worn away. In this example, since the electrode protrudes by the electronic pen 1 being inserted, the abrasion of the electrode and the cradle terminal is suppressed as compared with a case where the electrode is fixed to the first position (position where the electrode comes into contact with the cradle terminal). In addition, the electrode fixed while protruding is also rubbed against the housing, and thus serves as a resistor during the insertion of the electronic pen 1.

In this example, since the electrode does not protrude during the insertion of the electronic pen 1 and is not rubbed against the housing 10, resistance during the insertion of the electronic pen 1 becomes smaller than that in a case where the electrode is fixed to the first position. In addition, since the posture of the tip holding member 230 changes due to the weight of the electronic pen 1, the electrodes 221 and 222 are moved to the first position even when a person does not apply a force during the insertion of the electronic pen 1.

When the electrode holding member 240 is pushed up, the rear end 221q of the electrode 221 and the rear end 222q of the electrode 222 are also pushed up. In this manner, even when the electrode is moved, the electrodes and the substrate 270 are connected to each other through the FPCs 261 and 262 which are wiring members maintaining electrical characteristics in spite of being deformed. In addition, each of the FPCs has a length depending on a distance by which the electrode is moved. The length will be described with reference to FIG. 8.

Figure 8:
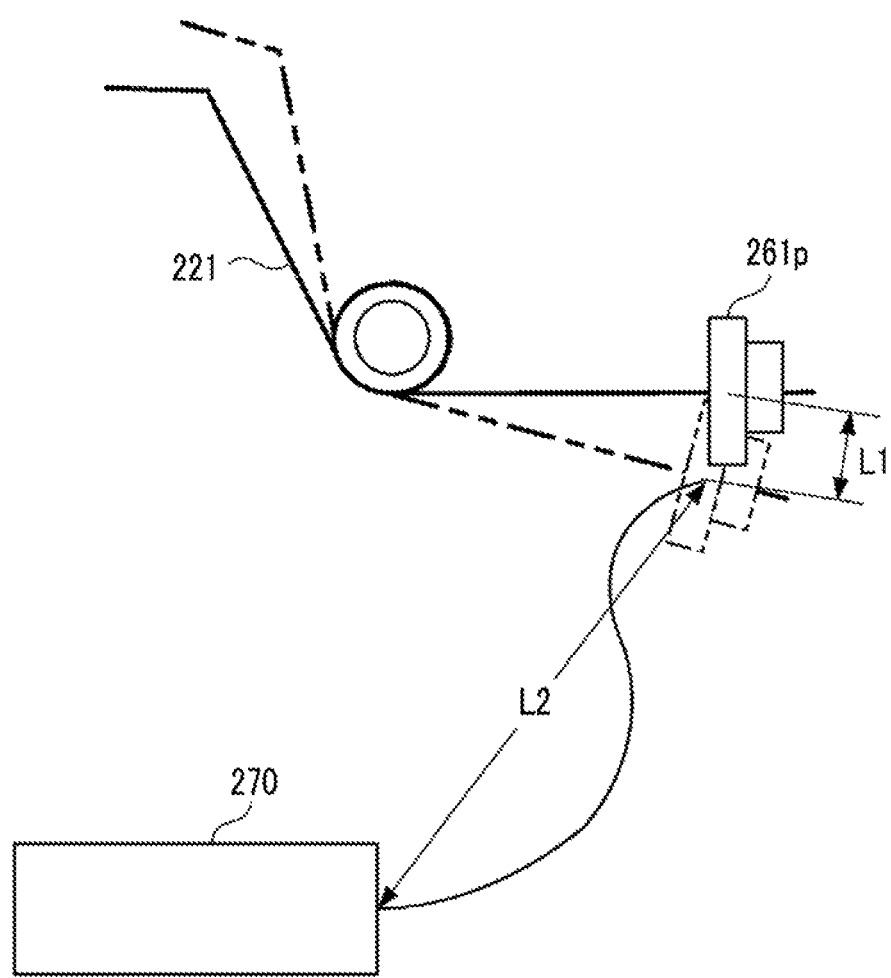
FIG. 8 is an enlarged view of an electrode.

FIG. 8 illustrates the electrode 221 in an enlarged manner. When the electrode 221 rotates from the state illustrated in FIG. 5 to the state illustrated in FIG. 6, an end 261p of the FPC 261 which is fixed to the electrode 221 is moved by a distance L1. In this case, the FPC 261 becomes longer than the sum of a distance L2 between both ends of the FPC itself and the distance L1 in the state illustrated in FIG. 5. Thereby, even when the electrode is moved, connection between the substrate 270 and the electrode is maintained.

In addition, in the electronic pen 1, the rear end 221q side of the electrode 221 and the rear end 222q side of the electrode 222 are connected to ends (ends 261p and 262p illustrated in FIG. 6) of separate flexible printed circuits (FPC), respectively. When rear end sides of both the electrodes are connected an end of one FPC, the following problem occurs.

Figure 9A:
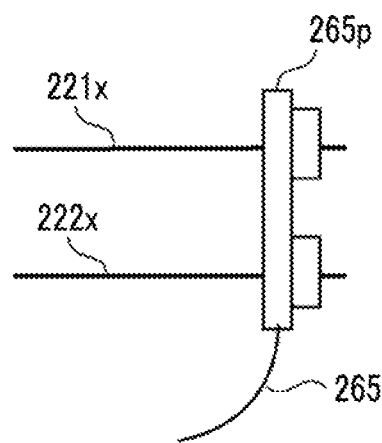
FIGS. 9A and 9B are diagrams illustrating two electrodes connected to one FPC.
Figure 9B:
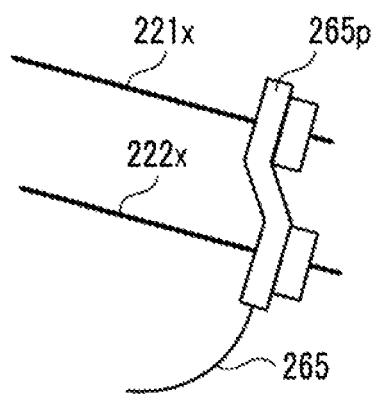

FIGS. 9A and 9B illustrate electrodes 221x and 222x connected to one FPC 265. FIG. 9A illustrates both the electrodes when the tips of the respective electrodes protrude from the contact surface 212s of the second supporting member, and FIG. 9B illustrates both the electrodes when the tips of the respective electrodes are drawn from the contact surface 212s. In FIG. 9A, an end 265p of the FPC 265 connected to the rear end sides of both the electrodes has a shape of one straight plate. On the other hand, in FIG. 9B, distortion occurs in portions of the end 265p into which both the electrodes are inserted.

In this manner, in the examples illustrated in FIGS. 9A and 9B, a portion of a force for moving the electrode to a first position may be used as a force for deforming the end 265p of the FPC 265, and the electrode may not be moved up to the first position depending on the rigidity of the end 265p. In the electronic pen 1, the rear end sides of both the electrodes are connected to ends of separate FPCs, respectively, as described above, and thus a force is not required to deform the end of the FPC, and the electrodes are easily moved to the first position as compared to the examples illustrated in FIGS. 9A and 9B. In addition, a distance between the two electrodes may be designed to be shorter than that in the example illustrated in FIGS. 9A and 9B.

The pen locking mechanism 280 includes a push member 281 and a locking member 282. The push member 281 includes a spring and the like, and pushes the locking member 282 against the electronic pen 1 by applying a force directed toward the electronic pen 1 side. When the electronic pen 1 is inserted into the cradle 2, the pen locking mechanism 280 is disposed such that the recess 18 of the housing 10 is located at a position where the locking member 282 is pushed.

Figure 10A:
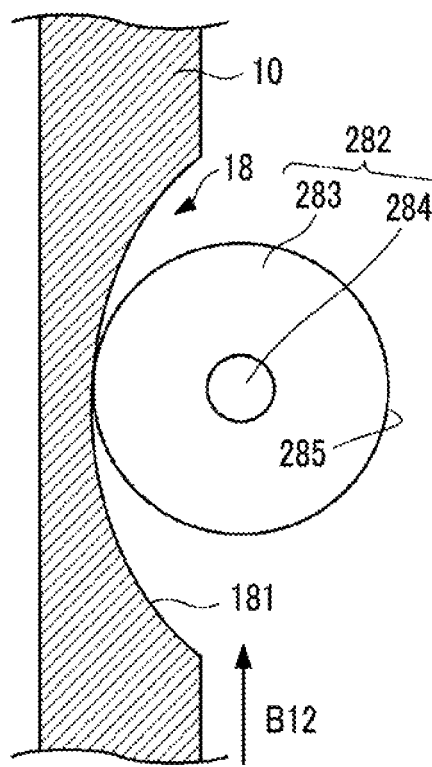
FIGS. 10A and 10B are enlarged views of a recess and a locking member.
Figure 10B:
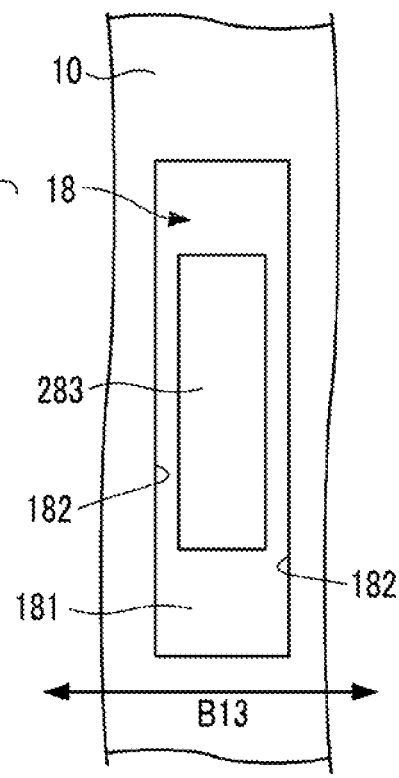

FIGS. 10A and 10B illustrate the recess 18 and the locking member 282 in an enlarged manner. FIG. 10A illustrates a cross-section of the housing 10 including the recess 18. The recess 18 is formed by a recess surface 181 having an arc-shaped cross-section. The locking member 282 is a member which is pushed against the recess 18 of the electronic pen 1 inserted into the cradle 2, and is an example of a "push member" of the present invention. The locking member 282 includes a disk-shaped disk portion 283 and a rotation axis 284 rotatably supporting the disk portion 283. The rotation axis 284 is supported by the push member 281 not shown in the drawing. The radius of the recess surface 181 is larger than the radius of an outer circumferential surface 285. Thereby, when the locking member 282 is pushed against the recess 18, the outer circumferential surface 285 of the disk portion 283 comes into contact with the recess surface 181.

When the electronic pen 1 is extracted from the cradle 2, the housing 10 is moved in an extraction direction B12. Then, the disk portion 283 is pushed back while rotating by friction with the recess surface 181. When the disk portion 283 is not rotated, the friction serves as a resistance force during the extraction of the electronic pen 1. However, in this example, the friction is converted into a turning force of the disk portion 283. For this reason, a resistance force during the extraction of the electronic pen 1 becomes smaller than that in a case where the disk portion 283 is not rotated.

FIG. 10B illustrates the recess 18 viewed from the front side and a rotation direction B13 when the housing 10 is rotated around the axis of the cylindrical portion 11. A flat lateral side 182 is formed on the rotation direction B13 side of the recess surface 181. For this reason, in a case where a force for performing rotation in the rotation direction B13 is applied to the electronic pen 1, the disk portion 283 is caught by the lateral side 182, and thus the rotation is not performed any more. In this manner, the electronic pen 1 inserted into the cradle 2 is not rotated by the pen locking mechanism 280.

The roller 290 includes a disk portion 291 having a disk shape and a rotation axis 292 rotatably supporting the disk portion 291. When the electronic pen 1 is inserted into the cradle 2, the disk portion 291 comes into contact with the housing 10 and pushes the electronic pen 1 to the second supporting member 212 side. The disk portion 291 pushes the electronic pen 1 while rotating by friction with the housing 10, and thus a resistance force during the insertion of the electronic pen 1 becomes smaller than that in a case where the disk portion 291 is not rotated.

When the electronic pen 1 is extracted from the cradle 2, the forces F2 and F3 illustrated in FIG. 6, having been applied by the electronic pen 1, are not applied, and thus the rear end sides of the respective electrodes 221 and 222 are pushed vertically downward by the force F1 as illustrated in FIG. 5, and the contact region 233 side of the plate member 231 is pushed vertically upward. In this manner, when the electronic pen 1 is extracted from the cradle 2, the movement mechanism 400 moves the electrodes 221 and 222 up to a position (hereinafter, referred to as a "second position") where the electronic pen 1 is located before the electronic pen is inserted.

The force F1 is applied to the tip holding member 230 by the electrode holding member 240 and the coil spring 250. In this manner, when the electronic pen 1 is extracted from the cradle 2, the movement mechanism 400 applies the force F1 for returning the tip holding member 230 (example of a posture changing member) to its original posture to the tip holding member 230 to thereby move the electrodes 221 and 222 up to the above-mentioned second position. Thereby, the abrasion of the cradle terminal 37 during the extraction of the electronic pen 1 is suppressed as compared with a case where the electrodes 221 and 222 are not moved to the second position.

[2] Modification Example

The above-described example is just an example of the implementation of the present invention, and may be modified as follows. In addition, the example and the modification examples may be implemented in combination with each other as necessary.

[2-1] Pen Locking Mechanism

A pen locking mechanism is not limited to that described in the example. For example, the shape of a push member pushed against a recess of an electronic pen 1 may be a spherical shape or a semi-spherical shape instead of a disk shape. The shape of the recess in this case will be described with reference to FIGS. 11A and 11B.

FIGS. 11A and 11B illustrate an example of a recess 18a of this modification example. FIG. 11A illustrates a cross-section of the recess 18a when viewed in a horizontal direction. In this cross-section, a recess surface 181a of the recess 18a has a shape overlapping the circumference of a circle having a radius r1. FIG. 11B illustrates a cross-section of the recess 18a when viewed in a vertically downward direction. In this cross-section, the recess surface 181a of the recess 18a has a shape overlapping the circumference of a circle having a radius r2 smaller than the radius r1.

For example, in a case where a spherical push member is pushed against the recess 18a, the push member is gently pushed as the radius of the recess surface 181a in a movement direction of a housing 10a increases, and thus a force for moving the housing 10a may be small. Accordingly, in a case where a spherical push member is pushed against the recess 18a, a force required to push back the push member during the rotation of the electronic pen 1 becomes larger than a force required to push back the push member when the electronic pen 1 is taken out of and in the cradle 2.

Thereby, the rotation of the electronic pen 1 inserted into the cradle 2 is suppressed while reducing resistance in extracting and inserting the electronic pen 1 from and into the cradle 2. Meanwhile, the shape of the push member may be changed instead of changing the radius of a surface in which a recess is formed as in the examples illustrated in FIGS. 11A and 11B. For example, an ellipsoid having a direction in which an electronic pen is extracted and inserted as a longitudinal direction is configured as a push member, and thus a force for pushing back the push member is as described above.

[2-2] Force Adjustment Mechanism

A force for moving an electrode up to a first position (hereinafter, referred to as a "first force") and a force for moving an electrode up to a second position (hereinafter, referred to as a "second force") may be adjusted.

Figure 12:
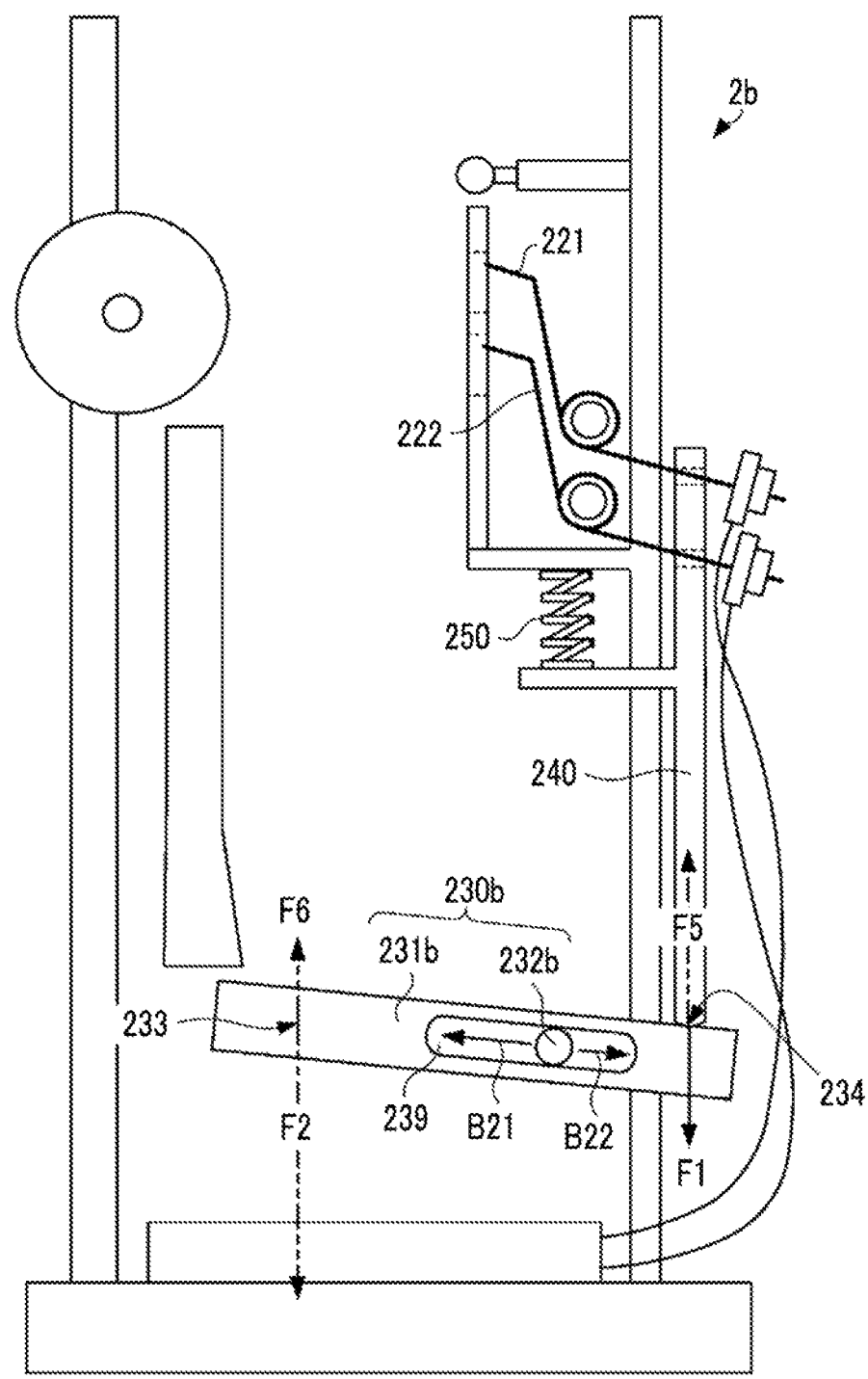
FIG. 12 is a diagram illustrating an example of a cradle according to a modification example.

FIG. 12 illustrates an example of a cradle 2b according to this modification example. The cradle 2b includes a tip holding member 230b. The tip holding member 230b includes a plate member 231b and a fulcrum member 232b. The plate member 231b includes a rail portion 239. The rail portion 239 forms a space in which the fulcrum member 232b is stored, and movably supports the fulcrum member 232b having a columnar shape in a direction B21 directed to the contact region 233 from the contact region 234 and a direction B22 which is opposite thereto.

The fulcrum member 232b is fixed to any position in the rail portion 239. As a fixed position of the fulcrum member 232b becomes closer to the contact region 233, a fulcrum becomes closer to a force point (point to which the weight of the electronic pen 1 is applied), and an application point (point to which a force is applied to the electrode holding member 240) becomes distant from the fulcrum, and thus a vertically upward force F5 applied to the electrode holding member 240 in the contact region 234 becomes smaller due to a force F2 applied from the electronic pen 1 in the contact region 233. The force F5 is an example of a first force for moving the electrodes 221 and 222 up to the first position.

On contrary, as the fixed position of the fulcrum member 232b becomes distant from the contact region 233, the fulcrum becomes distant from the force point, and the application point becomes closer to the fulcrum, and thus the force F5 becomes larger even when the above-mentioned force F2 does not change. For this reason, for example, in a case where the electrodes 221 and 222 do not protrude during the use thereof or a contact with a cradle terminal is worsened, the contact is restored to its original condition by performing adjustment so as to increase the force F5.

In addition, even when vertically downward force F1 (which is the sum of a force from the coil spring 250 and gravity applied to the electrode holding member 240) which is applied to the contact region 234 does not change, a force F6 for raising the contact region 233 side of the tip holding member 230b becomes smaller as the fulcrum becomes closer to the contact region 234, and the force F6 becomes larger as the fulcrum becomes distant from the contact region 234. The force F6 is an example of a force for returning the tip holding member 230b to its original posture, that is, a second force for moving the electrodes 221 and 222 to the second position. For this reason, for example, even when the tip holding member 230b is not returned to its original posture due to the use thereof, the tip holding member returns to its original posture by performing adjustment so as to increase the force F6.

In this modification example, the tip holding member 230b functions as an adjustment mechanism that adjusts a force (for example, the force F5) which is applied to an electrode by the member having a changed posture and the size of a force (for example, the force F6) for returning the member to its original posture. Thereby, for example, even when electronic pens having different weights are inserted, the degree of protrusion of the electrodes 221 and 222 and a return condition of the posture of the tip holding member 230b are adjusted by adjusting the first force and the second force.

Meanwhile, a configuration of the adjustment mechanism is not limited thereto. For example, the adjustment mechanism may be a mechanism that adjusts the first force and the second force by changing the amount of contraction of the coil spring 250 by a change in the position of the member that comes into contact with the edge of the coil spring 250. In addition, for example, the adjustment mechanism may be a mechanism that adjusts the first force and the second force by hanging a heavy object such as a weight on the electrode holding member or applying a load using a motor or the like. In addition, the adjustment mechanism may be a mechanism that adjusts only the first force, or may be a mechanism that adjusts only the second force. In short, any mechanism may be used as the adjustment mechanism insofar as the mechanism adjusts either one or both of the first force and the second force. In both cases, either one or both of a contact condition between the electrode and the terminal and a return condition of the posture of the tip holding member are adjusted.

[2-3] Pen Rotation Mechanism

When an electronic pen is inserted into a cradle, a pen tip side of the electronic pen may be regulated to face a specific direction.

Figure 13A:
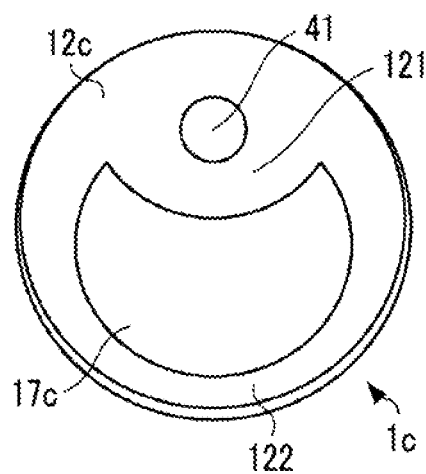
FIGS. 13A and 13B are diagrams illustrating an example of an electronic pen according to a modification example.
Figure 13B:
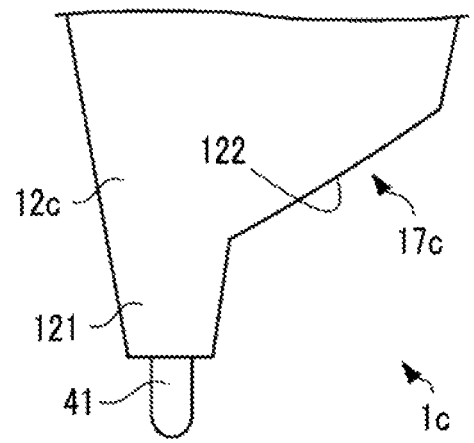

FIGS. 13A and 13B illustrate an example of an electronic pen 1c according to this modification example. FIG. 13A illustrates the electronic pen 1c viewed from the front side, and FIG. 13B illustrates the electronic pen 1c viewed in the width direction of the electronic pen 1c. The electronic pen 1c includes a tip portion 12c provided with an opening 17c. The opening 17c has a shape in which a portion of a circle is broken when viewed from the front side, as illustrated in FIG. 13A, and the broken portion is provided with a pen tip portion 121 at which the pen tip 41 is disposed in the tip portion 12c. In addition, an inclined plane 122 is formed in a portion other than the pen tip portion 121 in the tip portion 12c.

Figure 14A:
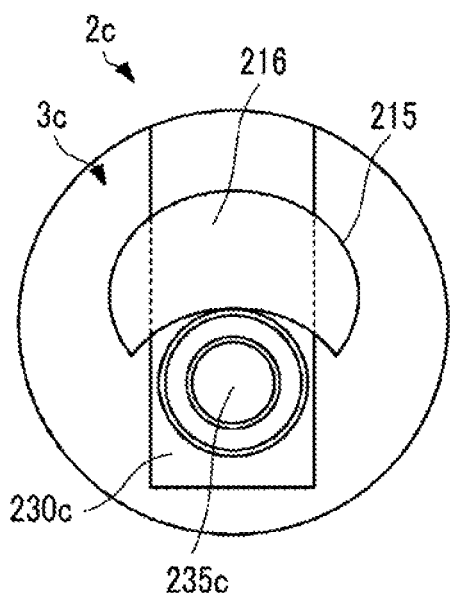
FIGS. 14A and 14B are diagrams illustrating an example of a cradle according to a modification example.
Figure 14B:
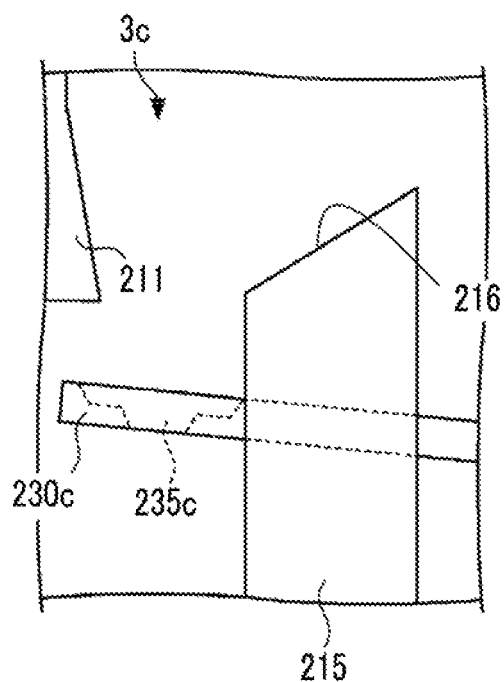

FIGS. 14A and 14B illustrate an example of a cradle 2c according to this modification example. FIG. 14A illustrates the cradle 2c viewed from a side into which the electronic pen 1c is inserted, and FIG. 14B illustrates the inside of a hole 3c of the cradle 2c disposed on a desk or the like when viewed in the horizontal direction. The cradle 2c includes a regulating member 215 at a position facing the opening 17c when the pen tip 41 of the electronic pen 1c inserted into the hole 3c is positioned at a hole 235c of a tip holding member 230c.

The regulating member 215 includes an inclined plane 216 in a vertically upward direction (a side on which the hole 3c is opened). The inclined plane 216 is a plane formed to be inclined in such a manner that a side thereof separated from the hole 235c of the tip holding member 230c is high and a side thereof close to the hole 235c is low. The wording "plane formed to be inclined" as used herein refers to a plane of which the normal line forms an angle with respect to either a direction perpendicular to an insertion direction B11 or a direction perpendicular to an insertion direction B11. The regulating member 215 is formed to be smaller than the opening 17c and is configured such that an end thereof on the inclined plane 216 side enters the opening 17c.

Figure 15A:
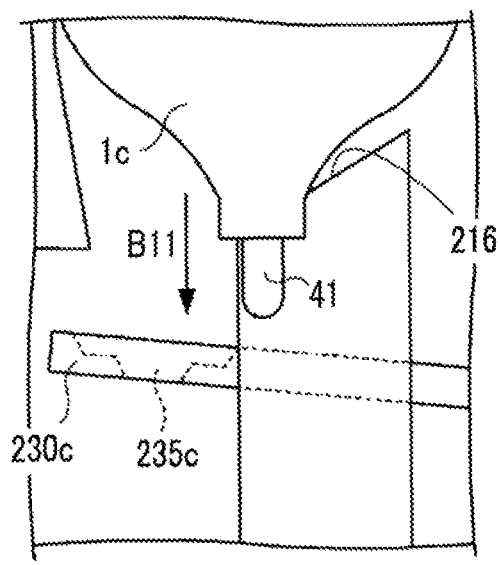
FIGS. 15A and 15B are diagrams illustrating an example of the behavior of an electronic pen inserted into a cradle.
Figure 15B:
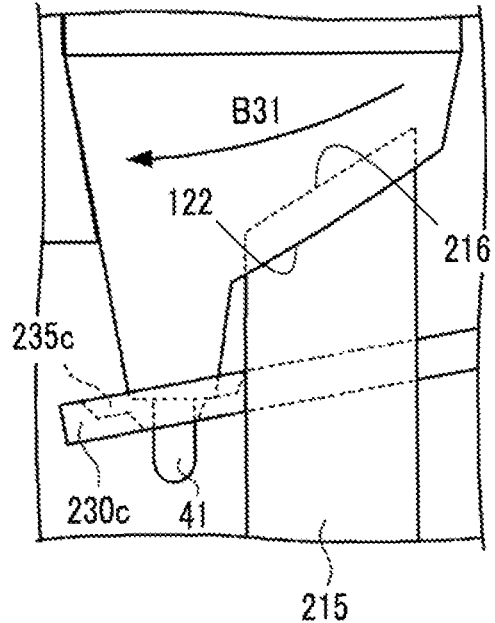

FIGS. 15A and 15B illustrate an example of the behavior of the electronic pen 1c inserted into the cradle 2c. FIG. 15A illustrates a state where the pen tip 41 of the electronic pen 1c moving in the insertion direction B11 moves toward a position different from a position at which the hole 235c of the tip holding member 230c is provided. In this case, the inclined plane 122 of the electronic pen is illustrated in FIGS. 13A and 13B and the inclined plane 216 of the regulating member 215 come into contact with each other, and the electronic pen 1c rotates in a rotation direction B31 until the position of the electronic pen reaches a position at which the hole 235c comes in the insertion direction B11 of the pen tip 41. After the electronic pen rotates until reaching the position, the regulating member 215 enters the opening 17c, thereby allowing the pen tip 41 to pass through the hole 235c and holding the tip portion 12c by the tip holding member 230c.

As described above, the regulating member 215 functions as a rotation mechanism that rotates the electronic pen 1 so that the pen tip 41 is guided to a determined position (in the example of FIGS. 15A and 15B, a position where the hole 235c comes in the insertion direction B11 of the pen tip 41) when the electronic pen 1c is inserted into the cradle 2c. Thereby, a cradle terminal of the electronic pen comes into contact with an electrode without paying attention to the direction of the electronic pen during the insertion of the electronic pen into the cradle.

[2-4] Number and Arrangement of Electrodes

Although two electrodes are provided in the cradle in the example, the number of electrodes to be provided may be one or three or more. Although two electrodes are arranged side by side in the insertion direction B11 in the example, the electrodes may be arranged side by side in the width direction of the electronic pen. In short, the number and position of electrodes to be provided may correspond to those of cradle terminals included in the electronic pen.

[2-5] Function of Cradle

A cradle has a communication function and a charging function in the example. However, the invention is not limited thereto, and the cradle may have any one of the functions or may have another function (for example, a function of being connected to a peripheral device, a display function, a soundproofing function, or the like).

[2-6] Posture Changing Member

Although the tip holding member 230 which is an example of a posture changing member has a posture changing depending on the weight of the electronic pen 1 in the example, the invention is not limited thereto. For example, the posture of the electronic pen 1 may be changed by a force pushed by a user. Thereby, the invention may be applied to, for example, a cradle into which an electronic pen is inserted in an insertion direction along a horizontal direction or an insertion direction having a vertically upward component.

[2-7] Movement to Second Position

Although an electrode is moved to a second position when an electronic pen is extracted from a cradle in the example, the invention is not limited thereto. For example, even when an electronic pen is extracted by a fixed member that inserts an electrode moved to a first position and fixes the electrode at the first position, the electrode remains stopped at the first position, and thus the electrode released from the fixed member may be moved to the second position by a user moving a lever provided in a cradle. Even in this case, when the electronic pen is inserted, the abrasion of the electrode and a cradle terminal are suppressed as compared to a case where the electrode is fixed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic apparatus comprising:
    a supporting member that supports an electronic pen including a terminal when the electronic pen is inserted into the electronic apparatus;
    an electrode that is movably supported; and
    a movement mechanism that moves the electrode to a first position where the electrode comes into direct contact with the terminal by a force received from the electronic pen, when the electronic pen is inserted into the electronic apparatus, wherein
    the movement mechanism moves the electrode up to a second position where the electrode is located before the electronic pen is inserted, when the electronic pen is extracted from the electronic apparatus,
    in the first position, a free end of the electrode protrudes through a hole provided in the electronic apparatus so as to protrude outward from the hole in order to come into contact with the terminal,
    in the second position, the electrode does not protrude through the hole,
    the movement mechanism moves the electrode to the first position where the electrode comes into direct contact with the terminal when the electronic pen is inserted into the electronic apparatus in an insertion direction, and
    the movement mechanism includes a plate member configured to move in a first direction that is parallel to the insertion direction in response to the electronic pen being inserted into the electronic apparatus in the insertion direction, and configured to move in a second direction that is opposite and parallel to the first direction in response to the electronic pen being removed from the electronic apparatus.

2. The electronic apparatus according to claim 1, wherein the movement mechanism includes a posture changing member having a posture that is changed by being pushed by the electronic pen inserted into the electronic apparatus, moves the electrode up to the first position by a force applied from the posture changing member having a changed posture, and applies a force for returning the changed posture to an original posture of the posture changing member to the posture changing member when the electronic pen is extracted to move the electrode up to the second position.

3. The electronic apparatus according to claim 2, wherein the posture changing member is configured such that the posture of the posture changing member is changed by a portion, coming into contact with the electronic pen, being pushed down due to a weight of the electronic pen.

4. The electronic apparatus according to claim 2, further comprising:
    an adjustment mechanism that adjusts size of a force applied by the posture changing member having a changed posture or size of a force for returning the changed posture to the original posture of the posture changing member.

5. The electronic apparatus according to claim 3, further comprising:
    an adjustment mechanism that adjusts size of a force applied by the posture changing member having a changed posture or size of a force for returning the changed posture to the original posture of the posture changing member.

6. The electronic apparatus according to claim 2,
    wherein the electronic pen has a pen tip, and
    wherein the posture changing member is provided with a hole at a location where the pen tip of the electronic pen inserted into the electronic apparatus is positioned.

7. The electronic apparatus according to claim 3,
    wherein the electronic pen has a pen tip, and
    wherein the posture changing member is provided with a hole at a location where the pen tip of the electronic pen inserted into the electronic apparatus is positioned.

8. The electronic apparatus according to claim 4,
    wherein the electronic pen has a pen tip, and
    wherein the posture changing member is provided with a hole at a location where the pen tip of the electronic pen inserted into the electronic apparatus is positioned.

9. The electronic apparatus according to claim 1,
    wherein the electronic pen includes a housing including a cylindrical portion having a cylindrical shape, and a pen tip provided at a position separated from an axis of the cylindrical portion, and
    wherein the electronic apparatus further comprises a rotation mechanism that rotates the electronic pen so that the pen tip is guided to a determined position when the electronic pen is inserted into the electronic apparatus.

10. The electronic apparatus according to claim 2,
    wherein the electronic pen includes a housing including a cylindrical portion having a cylindrical shape, and a pen tip provided at a position separated from an axis of the cylindrical portion, and
    wherein the electronic apparatus further comprises a rotation mechanism that rotates the electronic pen so that the pen tip is guided to a determined position when the electronic pen is inserted into the electronic apparatus.

11. The electronic apparatus according to claim 3,
wherein the electronic pen includes a housing including a cylindrical portion having a cylindrical shape, and a pen tip provided at a position separated from an axis of the cylindrical portion, and
wherein the electronic apparatus further comprises a rotation mechanism that rotates the electronic pen so that the pen tip is guided to a determined position when the electronic pen is inserted into the electronic apparatus.

12. The electronic apparatus according to claim 4,
wherein the electronic pen includes a housing including a cylindrical portion having a cylindrical shape, and a pen tip provided at a position separated from an axis of the cylindrical portion, and
wherein the electronic apparatus further comprises a rotation mechanism that rotates the electronic pen so that the pen tip is guided to a determined position when the electronic pen is inserted into the electronic apparatus.

13. The electronic apparatus according to claim 6,
wherein the electronic pen includes a housing including a cylindrical portion having a cylindrical shape, and a pen tip provided at a position separated from an axis of the cylindrical portion, and
wherein the electronic apparatus further comprises a rotation mechanism that rotates the electronic pen so that the pen tip is guided to a determined position when the electronic pen is inserted into the electronic apparatus.

14. The electronic apparatus according to claim 1, further comprising:
an electronic component; and
a flexible printed circuit that electrically connects the electrode and the electronic component to each other and has a length corresponding to a distance by which the electrode moves.

15. The electronic apparatus according to claim 1, further comprising:
a push member that is pushed into a recess of the electronic pen inserted into the electronic apparatus and is configured such that a force required for pushing back the push member during rotation of the electronic pen is larger than a force required for pushing back the push member when the electronic pen is taken out of and into the electronic apparatus.

* * * * *